United States Patent [19]

Muller et al.

[11] 4,200,623

[45] Apr. 29, 1980

[54] PROCESS FOR THE PREPARATION OF A HYDROGEN RESERVE

[75] Inventors: Alain Muller; Philippe Engelhard; Joseph E. Weisang, all of Le Havre, France

[73] Assignee: Compagnie Francaise de Raffinage, Paris, France

[21] Appl. No.: 954,648

[22] Filed: Oct. 25, 1978

[30] Foreign Application Priority Data

Oct. 27, 1977 [FR] France .................. 77 32499

[51] Int. Cl.$^2$ ............................. C01B 6/24
[52] U.S. Cl. .................. 423/644; 423/647; 423/648 R; 34/15; 75/168 R; 75/168 J; 75/168 K; 75/170; 75/175.5; 75/176
[58] Field of Search ............ 423/644, 647, 648 R; 75/168 J, 170, 175.5, 176; 34/15

[56] References Cited

U.S. PATENT DOCUMENTS

| | | | |
|---|---|---|---|
| 3,479,165 | 11/1969 | Lyon | 423/647 |
| 3,922,872 | 12/1975 | Reilly et al. | 423/644 |
| 4,079,523 | 3/1978 | Sandrock | 423/644 |
| 4,107,405 | 8/1978 | Percheron et al. | 75/170 |
| 4,126,242 | 11/1978 | Yajima et al. | 75/168 J |
| 4,142,300 | 3/1979 | Gruen et al. | 423/644 |

OTHER PUBLICATIONS

Van Mal et al., "Journal of Less Common Metals", vol. 35, 1974, pp. 65-76.
Buschow et al., "Journal of Applied Physics", vol. 48, 1977, pp. 4643-4648.
Reilly et al. (2), "Inorganic Chemistry", vol. 13, 1974, pp. 218-222.

*Primary Examiner*—Herbert T. Carter
*Attorney, Agent, or Firm*—Curtis, Morris & Safford

[57] ABSTRACT

The preparation of hydrogen reserves by mixing magnesium with at least one other appropriate element, compacting the mixture obtained, and hydrogenating it. Such additional element includes at least one element selected from the group consisting of group IIIB, including the rare earths, and groups IVB, VIB, VIIB, VIII, and IA of the periodic table.

In particular, the mixture is subjected to a heat treatment between the compacting and hydrogenation steps.

Such reserves prepared have reversible capacities even at moderate temperatures.

9 Claims, No Drawings

PROCESS FOR THE PREPARATION OF A HYDROGEN RESERVE

The present invention relates to a process for the preparation of a hydrogen reserve and its application to the storage and production of hydrogen.

Growing energy needs have prompted specialists to take cognizance of the fact that the traditional energy resources, such as coal, petroleum or natural gas, are not inexhaustible, or at least that they are becoming costlier all the time, and that it is advisable to consider replacing them gradually with other energy sources, such as nuclear energy, solar energy, or geothermal energy. Hydrogen, too, is coming into use as an energy source.

Hydrogen may be used, for example, as fuel for internal-combustion engines in place of hydrocarbons. In this case it has the advantage of eliminating atmospheric pollution through the formation of oxides of carbon or of sulfur upon combustion of the hydrocarbons. Hydrogen may also be used to fuel hydrogen-air fuel cells for production of the electricity needed for electric motors.

One of the problems posed by the use of hydrogen is its storage and transportation. A number of solutions have been proposed:

Hydrogen may be stored under high pressure in steel cylinders. But this approach has the drawback of requiring hazardous and heavy containers which are difficult to handle.

Hydrogen may also be stored in cryogenic containers. But this entails the disadvantages associated with the use of cryogenic liquids; such as, for example, the high cost of the containers, which also require careful handling.

Another method of storing hydrogen is to store it in the form of a hydride, which then is decomposed at the proper time to furnish hydrogen. The hydrides of iron-titanium, lanthanum-nickel, vanadium, and magnesium have been used in this manner, as described in French Pat. No. 1,529,371.

The use of magnesium hydride holds promise because the hydrogen content of the hydride may, in the case of the stoichiometric hydride, $MgH_2$, represent up to 8.3% of the weight of the magnesium it contains.

However, the use of magnesium for the storage of hydrogen in the form of magnesium hydride is not entirely satisfactory. In fact at a pressure of 1 bar, a temperature of about 400° C. is required to decompose magnesium hydride; which lessens the economic interset and practical uses of such a hydrogen reserve considerably.

Moreover, the hydrogen capacity of such a reserve diminishes during the decomposition-reconstitution cycles. This phenomenon may be explained by a progressive poisoning of the surface, which during the reconstitution renders the magnesium atoms located in the interior of the reserve inaccessible to the hydrogen.

The temperature of decomposition of the magnesium hydride may be reduced and the capacity of the hydrogen reserve maintained by adding a dope to the magnesium, as described in applicants patent application Ser. No. 954,649.

In the course of their work, the applicants have developed a particularly advantageous mode of preparation of a hydrogen reserve containing magnesium and a dope formed of at least one other element.

Thus it is an object of the present invention to improve the storage of hydrogen by magnesium.

A preferred embodiment of the present invention involves a process for preparing a hydrogen reserve comprising -

(a) mixing powdered magnesium with a powder selected from at least one element of group IIIB, including the rare earths, and groups IVB, VIB, VIIB, VIII, and IA of the periodic table;

(b) compacting of the mixture obtained in step (a); and (c) thereafter hydrogenating said compacted mixture; with the improvement comprising subjecting said mixture between the compacting of step (b) and the hydrogenating of step (c) to a heat treatment at a temperature of between 400° and 1,600° C., and preferably between 600° and 1,100° C.

Further preferred embodiments of the present invention comprise the reserves obtained by the process in accordance with the aforementioned process invention.

Finally, an additional preferred embodiment of the present invention comprises the use of said reserves obtained by the aforesaid process to the storage and production of hydrogen.

A preferred process of this invention thus may consist of subjecting the mixture to a heat treatment at a temperature between 400° and 1,600° C., and preferably between 600° and 1,100° C., after the magnesium has been mixed and compacted with at least one element from group IIIB, including the rare earths, and groups IVB, VIB, VIIB, VIII, and IA of the periodic table.

The lower limit is determined by the need for an adequate temperature to provide good contact between the magnesium and the other elements.

The upper limit is determined by the vapor pressure of magnesium in equilibrium with the liquid or solid phase.

The treatment should be carried out under an atmosphere that is inert relative to the supply, for example, a helium atmosphere, in particular, to avoid oxidation.

After the heat treatment, the mixture is hydrogenated at a temperature and pressure determined by the elements which it contains.

When the reserve contains, in addition to magnesium, at least two other elements, the starting material may be either an alloy of two elements, pulverized, or the elements themselves (since the hydrogen is fixed more rapidly by the mixture and the decomposition temperature of the supply is reduced).

To prepare reserves in accordance with the inventive process, the applicants have successfully used the following combinations:
Magnesium-lanthanum-nickel
Magnesium-cerium-nickel
Magnesium-titanium-nickel
Magnesium-titanium-molybdenum In order to obtain the reserve, the mixture is hydrogenated at a temperature of between 20° and 500° C., and preferably between 150° and 380° C., and at a pressure of between 0.1 and 200 bars, and preferably between 10 and 100 bars.

The reserve may then be decomposed to furnish hydrogen at a temperature of between 100° and 500° C., and preferably between 150° and 380° C., and at a pressure of between 0.1 and 150 bars, and preferably between 1 and 10 bars.

The reserve may then be reconstituted by hydrogenation under the same operating conditions as those employed in its formation.

The process according to the invention may be applied in particular to the formation of hydrogen reserves needed for the propulsion of motor vehicles. These vehicles may be powered by internal-combustion engines or electric motors, with the hydrogen feeding a fuel cell in the latter case.

In the case of internal-combustion engines, the temperature of the exhaust gases is sufficient to permit the decomposition of the hydrogen reserve and thus the fueling of the engine with hydrogen.

Moreover, since the weight percentage of the available hydrogen may be as high as 8.3%, based on the weight of the magnesium, the hydrogen reserves in accordance with the invention compare favorably with other possible sources of hydrogen for the propulsion of motor vehicles, such as pressurized cylinders, cryogenic containers, or other hydrides.

The process according to the invention may also be applied to the storage of hydrogen in fixed reserves, particularly for supplying hydrogen compressors, and these reserves may be reconstituted after use.

The following non-restrictive examples relate to the preparation of hydrogen reserves and to the use of said reserves for the production and storage of hydrogen.

As pointed out above, the reserves are obtained by mixing magnesium with at least one element from group IIIB, including the rare earths, and groups IVB, VIB, VIIB, VIII, and IA of the periodic table.

After being shaped by compacting, followed by a heat treatment, the mixture is hydrogenated to form the hydrogen reserve. During the hydrogenation, the mixture fixes a certain amount of hydrogen that depends on the temperature and pressure at which the hydrogenation is effected as well as on its duration.

In the description of the examples, "initial capacity" means the amount of hydrogen fixed during the first hydrogenation of the mixture, carried out to obtain the reserve. Said "initial capacity" is expressed as a percentage of the total weight of the mixture before the first hydrogenation. In defining this "initial capacity", the operating conditions of the hydrogenation will be given.

The reserves are then subjected to hydrogen production and fixation cycles by decomposition and reconstitution of the reserve.

The amounts of hydrogen liberated and fixed are measured by thermogravimetry, which permits calculation of:

1. the "average reserve capacity", or average amount of hydrogen liberated or fixed, which is obtained by taking the average of the results of a certain number of cycles. Said "average reserve capacity" is expressed as a percentage of the total weight of the initial mixture before the first hydrogenation.

2. The "average magnesium capacity", or average amount of hydrogen liberated or fixed, which is obtained by taking the average of the results of a certain number of cycles. Said "average magnesium capacity" is expressed as a percentage of the weight of the magnesium contained in the initial mixture before the first hydrogenation.

EXAMPLE 1

This example relates to the preparation in accordance with a preferred embodiment of the inventive process of six hydrogen reserves A1, A2, A3, A4, A5, and A6 containing magnesium, cerium, and nickel, said reserves then being subjected to tests consisting of decomposition and reconstitution cycles.

Preparation of reserves A1 and A2

The reserves A1 and A2 are prepared in an identical manner.

From magnesium powder of a particle size of 100$\mu$ and a powder of a cerium-nickel, CeNi$_5$, alloy of a particle size of 15$\mu$, two mixtures containing 54 wt. % magnesium, and 46 wt. % CeNi$_5$ alloy (i.e., 15% cerium and 31% nickel) are made. These mixtures are then compacted under a pressure of 20 tons/cm$^2$. The pellets obtained are heated to 800° C. over a period of 3½ hr. under a helium stream.

The pellets are then hydrogenated for 1 hr. at 320° C. at a hydrogen pressure of 100 bars.

In this way the reserves A1 and A2, whose "inital capacities" are 2%, are obtained.

Preparation of reserves A3, A4, A5 and A6

From magnesium, cerium, and nickel powders of particle sizes of 100, 200, and 15$\mu$, respectively, mixtures are made which are compacted under a pressure of 20 tons/cm$^2$. The pellets obtained are heated to an elevated temperature under a helium stream. The pellets are then hydrogenated for 1 hr. at a pressure of 100 bars. Thus the reserves A3, A4, A5, and A6 are obtained. Their composition and the details of their preparation are set forth in Table 1 below.

Table 1

| Reserve | Composition wt. % | | | Heat treatment | | Hydrogenation temperature °C. | Initial Capacity % |
| --- | --- | --- | --- | --- | --- | --- | --- |
| | Mg | Ce | Ni | Temp. °C. | Time hr | | |
| A3 | 54 | 15 | 31 | 810 | 4 | 220 | 3.3 |
| A4 | 54 | 15 | 31 | 810 | 4 | 220 | 3.3 |
| A5 | 65 | 11 | 24 | 720 | 5 | 300 | 4 |
| A6 | 60 | 14 | 26 | 720 | 5 | 290 | 3.85 |

Decomposition and reconstitution tests

The reserves A1, A2, A3, A4, A5, and A6 are subjected to decomposition and reconstitution cycles. The conditions and results of the tests are presented in Table 2 which follows.

Table 2

| Reserve | Decomposition pressure, bars | Reconstitution pressure, bars | Temperature of decomposition and reconstitution, °C. | Average capacity over n cycles | | |
| --- | --- | --- | --- | --- | --- | --- |
| | | | | n | Aver. reserve capacity % | Aver. magnesium capacity % |
| A1 | 1 | 100 | 317 | 3 | 1.8 | 3.3 |
| A2 | 1 | 100 | 329 | 3 | 1.98 | 3.7 |
| A3 | 1 | 80 | 310 | 4 | 3.2 | 5.9 |
| A4 | 1 | 100 | 307 | 7 | 3.25 | 6 |
| A5 | 1 | 80 | 300 | 10 | 4 | 6.2 |
| A6 | 1 | 80 | 290 | 10 | 3.85 | 6.4 |

The good capacity of the reserves A1, A2, A3, A4, A5, and A6 is apparent from this table.

The percentage of hydrogen liberated may be higher than 6%, provided that the decomposition temperature does not exceed 300° C. As is apparent, the best result is obtained when the elements cerium and nickel are used (A3, A4, A5, and A6) rather than the cerium-nickel alloy (A1 and A2).

EXAMPLE 2

This example relates to the preparation of four hydrogen reserves T1, B1 B2, and B3 containing magnesium, titanium, and nickel. These reserves are then subjected to tests consisting of decomposition and reconstitution cycles.

The control reserve T1 was prepared conventionally, without heat treatment, while the reserves B1, B2, and B3 were prepared in accordance with the process of the invention.

Preparation of reserve T1

From magnesium powder of a particle size of 100 and a powder of a titanium-nickel, Ti-Ni, alloy of a particle size of 10μ, a mixture containing 90 wt. % of magnesium, and 10 wt. % of a Ti-Ni alloy (i.e., 5.5 nickle and 4.5 titanium) is made. This mixture is compacted under a pressure of 20 tons/cm².

The pellet obtained is hydrogenated for 72 hr. at 285° C. at a hydrogen pressure of 80 bars.

In this way the reserve T1, whose "initial capacity" is 7%, is obtained.

Preparation of reserve B1

From magnesium, titanium, and nickel powders of particle sizes of 100, 25, and 15μ, respectively, a mixture containing 47 wt. % magnesium, 24 wt. % titanium, and 29 wt. % nickel is made.

This mixture is compacted under a pressure of 20 tons/cm². The pellet obtained is heated to 900° C. over a period of 4 hr. under a helium stream.

The pellet is then hydrogenated for 15 min. at 215° C. at a hydrogen pressure of 80 bars. Thus the reserve B1, whose "initial capacity" is 1.3%, is obtained.

Preparation of reserve B2

This reserve is prepared from a mixture containing 79.7 wt. % magnesium, 9.6 wt. % titanium, and 11.7 wt. % nickel.

This reserve is prepared in similar fashion to the reserve B1. Hydrogenation is for 10 min. at 164° C. at a hydrogen pressure of 100 bars.

In this way the reserve B2, whose "initial capacity" is 0.81%, is obtained.

Preparation of reserve B3

This reserve is prepared from a mixture containing 89.4 wt. % magnesium, 4.8 wt. % titanium, and 5.8 wt. % nickel.

This reserve is prepared in similar fashion to the reserves B1 and B2. Hydrogenation is for 20 min. at 169° C. at a hydrogen pressure of 90 bars.

Thus the reserve B3, whose "initial capacity" is 1.07%, is obtained.

Decomposition and reconstitution tests

The reserves T1, B1, B2, and B3 are subjected to decomposition and reconstitution cycles.

The conditions and results of the tests are presented in Table 3 which follows.

Table 3

| Reserve | Decomposition pressure, bars | Reconstitution pressure, bars | Rate of hydrogen fixation during first hydrogenation, % hr. | Decomposition and reconstitution temperatures, °C. | n | Average reserve capacity | Average magnesium capacity |
|---|---|---|---|---|---|---|---|
| T1 | 1 | 80 | 0.1 | 220 | No decomposition | | |
| B1 | 1 | 80 | * | 215 | 4 | 0.85 | 1.3 |
| B2 | 1 | 100 | * | 220 | 3 | 0.50 | 0.65 |
| B3 | 1 | 90 | 4.7 | 169 | 3 | 0.33 | 0.36 |

*Not measurable; too fast.

As is verified by this table, the reserves prepared in accordance with the inventive process have a reversible capacity at 220° C., which is not the case with the control reserve T1 at the same temperature and a higher fixation rate during the first hydrogenation.

EXAMPLE 3

This example relates to the preparation of a hydrogen reserve C1 containing magnesium, titanium, and molybdenum. The reserve is then subjected to a test consisting of decomposition and reconstitution cycles.

Preparation of reserve C1

From magnesium powder of a particle size of 100μ and a powder of a titanium-molybdenum, Ti₃Mo, alloy of a particle size of 15μ, a mixture containing 70 wt. % magnesium and 30 wt. % Ti₃Mo alloy (i.e., 18% titanium and 12% molybdenum) is made. This mixture is compacted under a pressure of 20 tons/cm².

The pellet obtained is subjected to a heat treatment at 900° C. for 3 hr. under a helium stream.

It is hydrogenated for 3 min. at 170° C. at a pressure of 80 bars.

Thus the reserve C1, whose "initial capacity" is 3.05%, is obtained.

Decomposition and reconstitution test

The reserve C1 is subjected to decomposition and reconstitution cycles.

The conditions and results of the tests are summarized in Table 4 which follows.

Table 4

| Reserve | Decomposition pressure, bars | Reconstitution pressure, bars | Temperature of decomposition and reconstitution °C. | n | Aver. reserve capacity | Aver. magnesium capacity |
|---|---|---|---|---|---|---|
| C1 | 1 | 80 | 287 | 3 | 0.87 | 1.24 |

As may be seen from this table, the reserve prepared by the process in accordance with the invention has a capacity that is reversible at a temperature of less than 300° C.

EXAMPLE 4

From magnesium, lanthanum, and nickel powders of particle sizes of 100, 25 and 15μ, respectively, mixtures are made which are compacted under a presure of 20 tons/cm². The pellets obtained are heated to an elevated temperature under a helium stream. The pellets are than hydrogenated for 1 hr. at a pressure of 100 bars at 250° C.

In this way the reserves D1, D2, D3 and D4 are obtained. Their composition and the details of their preparation are set forth in table 5 which follows.

Table 5

| Reserve | Composition wt. % | | | Heat Treatment | | Initial Capacity % |
|---|---|---|---|---|---|---|
| | Mg | La | Ni | Temp. °C. | Time hr. | |
| D1 | 55 | 15 | 30 | 650 | 7 | 4.2 |
| D2 | 65 | 11 | 24 | 720 | 7 | 4 |
| D3 | 65 | 11 | 24 | 700 | 6 | 5 |
| D4 | 70 | 10 | 20 | 700 | 6 | 4.8 |

Decomposition and reconstitution tests

The reserves D1, D2, D3 and D4 are subjected to decomposition and reconstitution cycles.

The condition and results of the tests are presented in Table 6 below.

Table 6

| Reserve | Decomposition pressure, bars | Reconstitution pressure, bars | Temperature of decomposition and reconstitution, °C. | Average capacity over n cycles | | |
|---|---|---|---|---|---|---|
| | | | | n | Aver. reserve capacity | Aver. magnesium capacity |
| D1 | 1 | 80 | 290 | 5 | 4.2 | 7.6 |
| D2 | 1 | 80 | 300 | 150 | 4 | 6.2 |
| D3 | 1 | 80 | 309 | 7 | 5 | 7.7 |
| D4 | 1 | 80 | 305 | 60 | 4.8 | 6.9 |

As may be seen from this table, the reserves prepared by the process in accordance with the invention have a high and long-lasting reversible capacity (150 cycles for reserve D2).

We claim:
1. A process for the preparation of a hydrogen reserve comprising the steps of
   (a) mixing of powdered magnesium with a powder of two elements or at least an alloy thereof selected from the group consisting of;
   (b) compacting of the mixture obtained in step (a);
   (c) heating the compacted mixture to a temperature of between 400° and 1,600° C.; and
   (d) hydrogenating the compacted mixture.
2. Process in accordance with claim 1, wherein said heat treatment is between 600° and 1,100° C.
3. Process in accordance with claim 2, wherein the heat treatment is effected under an atmosphere that is inert relative to the supply.
4. Process in accordance with claim 1, wherein the heat treatment is effected under an atmosphere that is inert relative to the supply.
5. Process in accordance with claim 3, wherein said two elements are in the form of an alloy.
6. Process in accordance with claim 3, wherein said two elements are in metallic form.
7. Process in accordance with claim 3, wherein the hydrogenation of the mixture is effected at a temperature between 20° and 500° C. and at a pressure between 0.1 and 200 bars.
8. Process in accordance with claim 3, wherein the hydrogenation of the mixture is effected at a temperature between 150° and 380° C. and at a pressure between 10 and 100 bars.
9. Process in accordance with claims 2, 3, 4, 5, 6, 7, or 8 wherein the reserve contains at least 54 wt. % magnesium.

* * * * *

UNITED STATES PATENT AND TRADEMARK OFFICE
CERTIFICATE OF CORRECTION

PATENT NO. : 4,200,623
DATED : April 29, 1980
INVENTOR(S) : Alain Muller, et al.

It is certified that error appears in the above-identified patent and that said Letters Patent are hereby corrected as shown below:

Column 8, claim 1, line 20, after "consisting of" insert --Ti-Ni and Ti-Mo--;

Column 4, line 67, after "exceed" insert --about--.

Signed and Sealed this

Thirteenth Day of January 1981

[SEAL]

Attest:

SIDNEY A. DIAMOND

Attesting Officer

Commissioner of Patents and Trademarks